July 25, 1933.        R. GUNN        1,919,215
THUNDERSTORM OR ELECTRIC FIELD AND POTENTIAL INDICATOR
Filed March 17, 1930        5 Sheets-Sheet 1
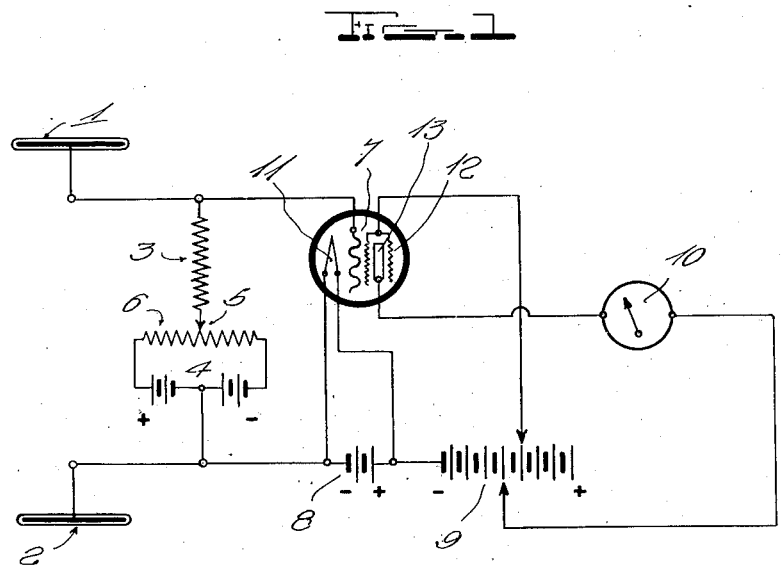
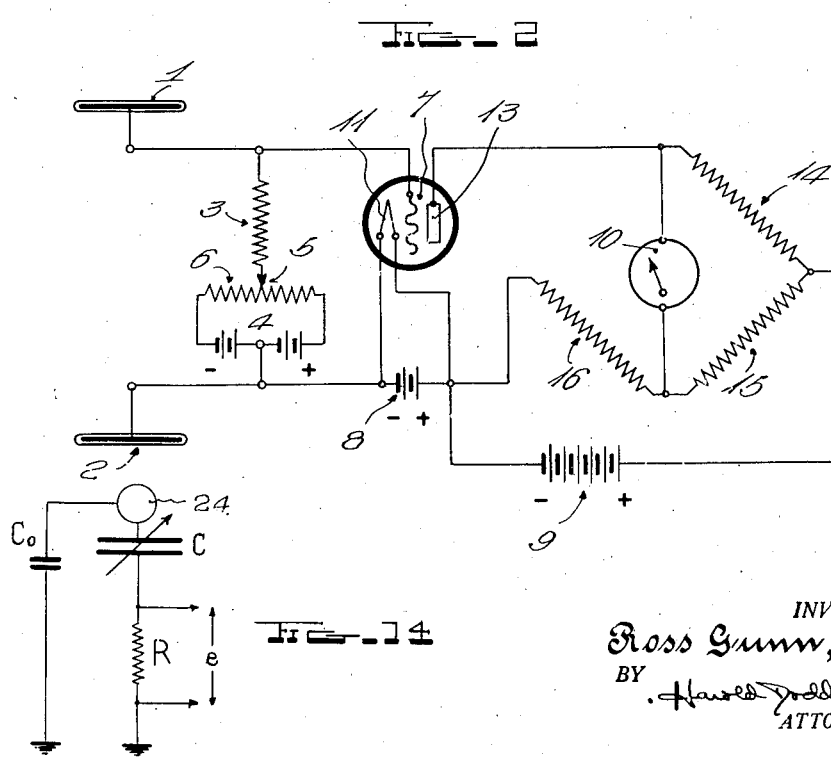
INVENTOR.
Ross Gunn,
BY
ATTORNEY July 25, 1933.   R. GUNN   1,919,215
THUNDERSTORM OR ELECTRIC FIELD AND POTENTIAL INDICATOR
Filed March 17, 1930   5 Sheets-Sheet 2
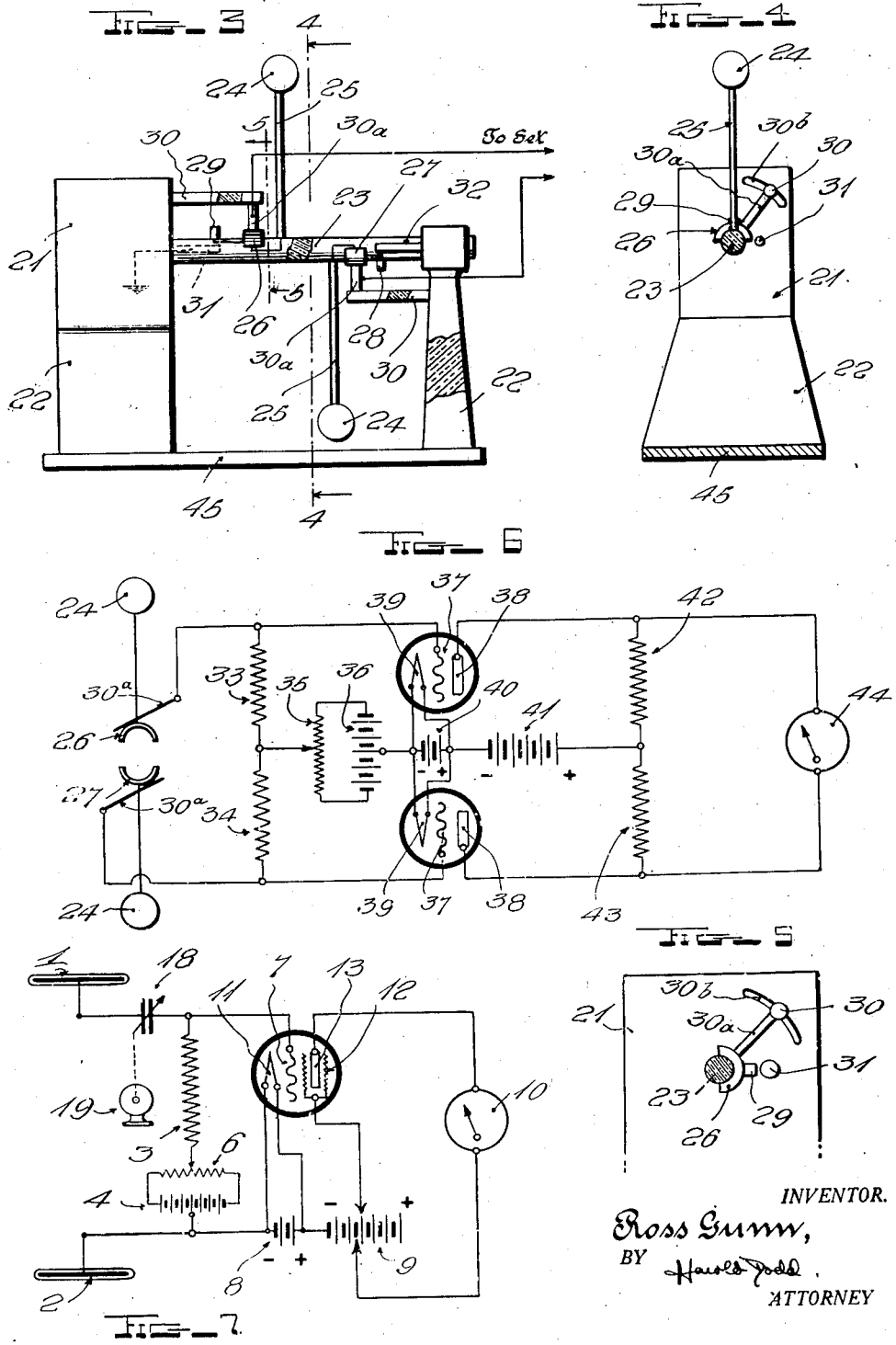
INVENTOR.
Ross Gunn,
BY Harold Todd
ATTORNEY July 25, 1933.  R. GUNN  1,919,215

THUNDERSTORM OR ELECTRIC FIELD AND POTENTIAL INDICATOR

Filed March 17, 1930  5 Sheets-Sheet 3

INVENTOR.
Ross Gunn,
BY Harold Todd
ATTORNEY.

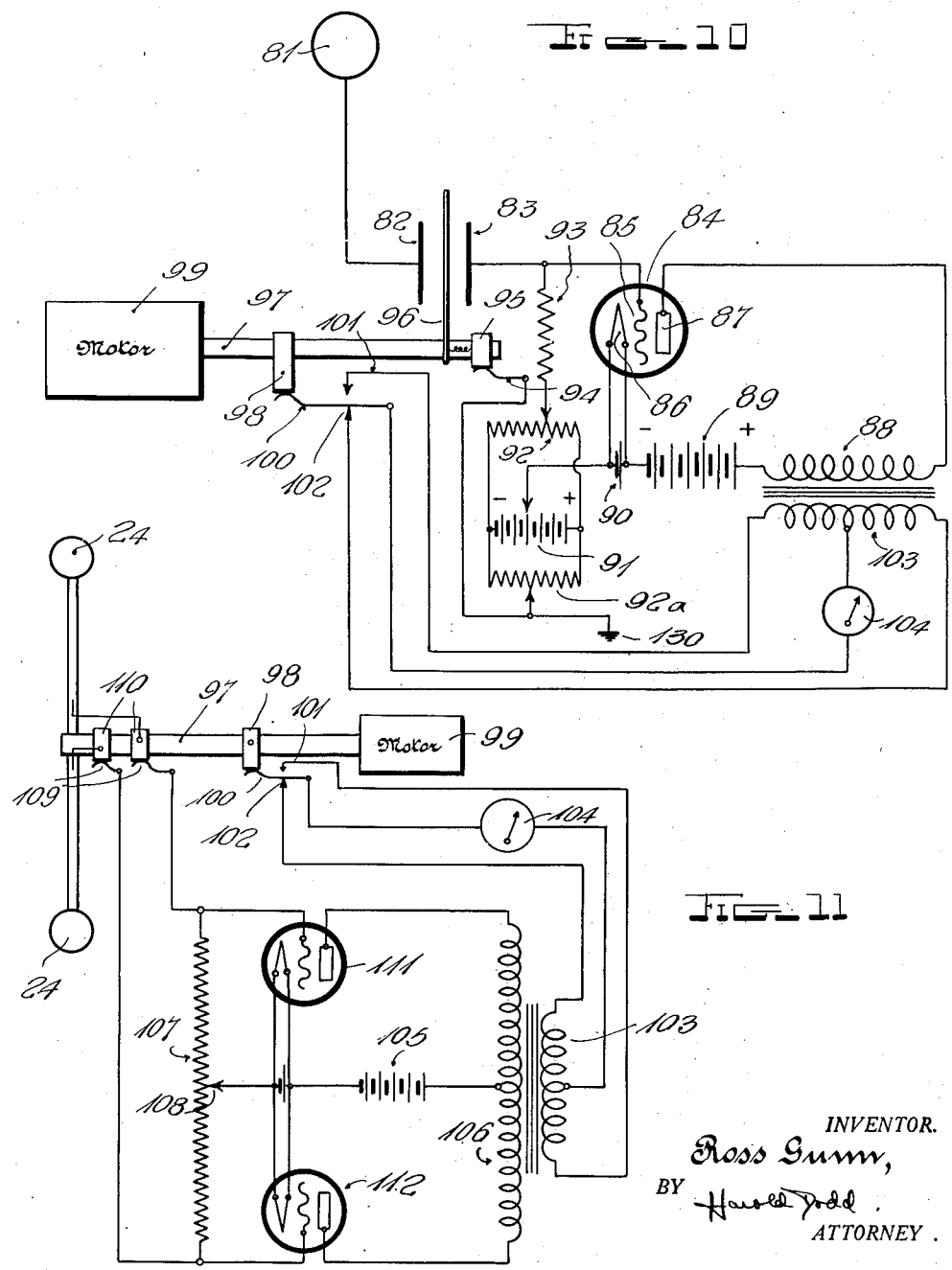

July 25, 1933.  R. GUNN  1,919,215
THUNDERSTORM OR ELECTRIC FIELD AND POTENTIAL INDICATOR
Filed March 17, 1930   5 Sheets-Sheet 5
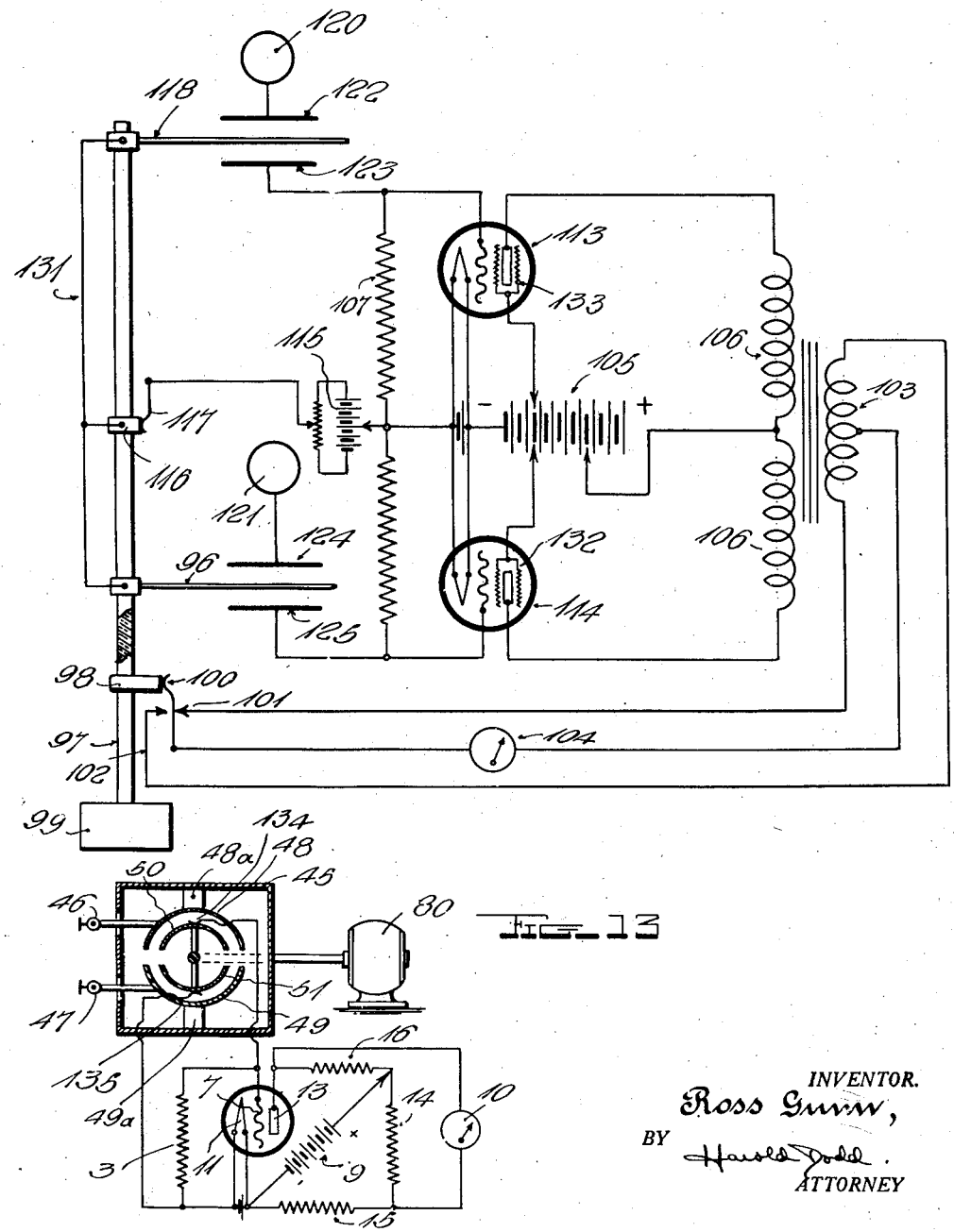
INVENTOR.
Ross Gunn,
BY Harold Dodd.
ATTORNEY Patented July 25, 1933

1,919,215

UNITED STATES PATENT OFFICE

ROSS GUNN, OF WASHINGTON, DISTRICT OF COLUMBIA

THUNDERSTORM OR ELECTRIC FIELD AND POTENTIAL INDICATOR

Application filed March 17, 1930. Serial No. 436,478.

(GRANTED UNDER THE ACT OF MARCH 3, 1883, AS AMENDED APRIL 30, 1928; 370 O. G. 757)

My invention relates broadly to electrical apparatus and more particularly to an apparatus and system for indicating the electrical condition of the atmosphere.

One of the objects of my invention is to provide a method and apparatus for indicating the electrical condition of the atmosphere for determining the approach of thunderstorms.

Another object of my invention is to provide an electrical indicating system in which the electrostatic potential of the atmosphere may be determined and the approach of thunderstorms forecast with precision.

Still another object of my invention is to provide a method of measuring static charges or potential differences by periodically charging and discharging a condenser system through a high resistance having a sensitive measuring instrument connected thereto for indicating the charges thus developed and indicating the relative strength thereof.

A further object of my invention is to provide a method for indicating small direct current potential differences by using the direct current potential differences to produce an alternating current and amplifying the alternating current to an amplitude at which it may be rectified synchronously and applied to an indicator.

A still further object of my invention is to provide a circuit arrangement for producing dynamic electric currents from static electric charges by alternately increasing and decreasing the capacity of the circuit and synchronously rectifying the alternating current so produced to operate an indicator for giving a suitable warning of the approach of a thunderstorm.

Figure 8:
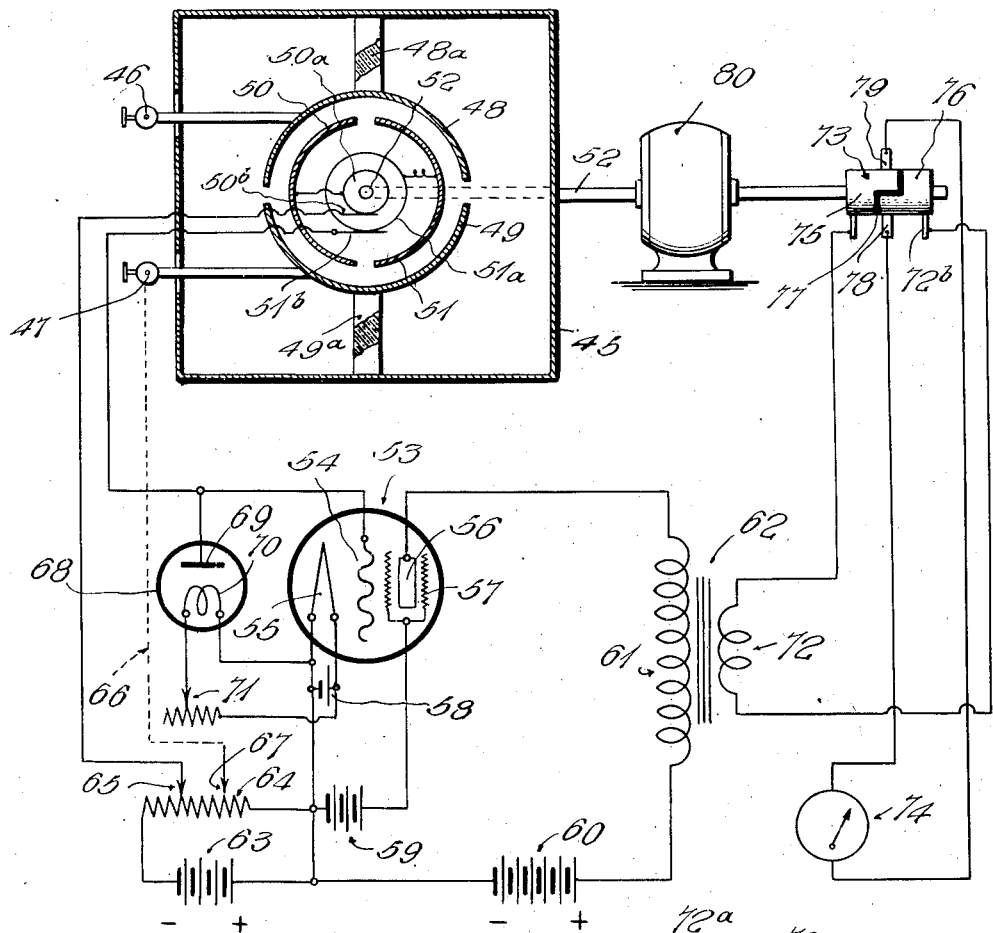
Figure 9:
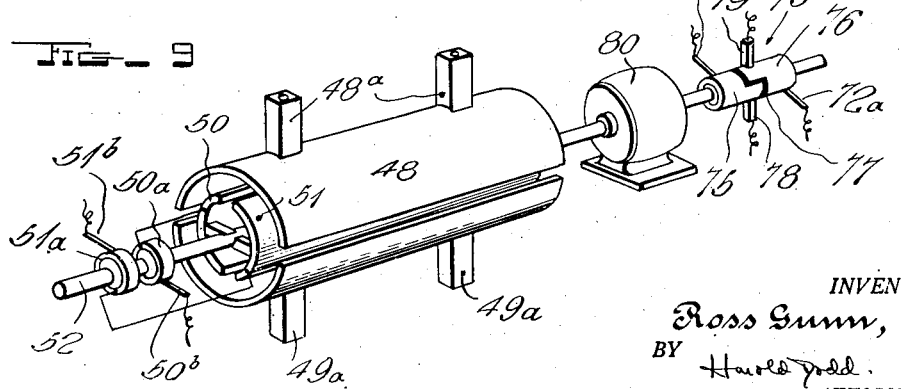

Other and further objects of my invention reside in the circuit arrangements, method and apparatus employed therein as set forth more fully in the specification hereinafter following by reference to the accompanying drawings, in which:

Figure 1 diagrammatically illustrates a circuit arrangement embodying the principles of my invention; Fig. 2 illustrates a modified circuit arrangement embodying the principles of my invention; Fig. 3 shows one form of mechanical collector which I may employ for charging the indicating circuit in the electrostatic measuring system of my invention; Fig. 4 is a cross-sectional view through the mechanical collector on line 4—4 of Fig. 3; Fig. 5 is a fragmentary cross-sectional view through the collector apparatus through lines 5—5 of Fig. 3; Fig. 6 shows a circuit arrangement for the collector apparatus of Figs. 3 and 4 and the indicator system of my invention; Fig. 7 is a diagrammatic circuit arrangement of a further modification of the electrostatic potential measuring apparatus embodying my invention; Fig. 8 illustrates a preferred form of electrostatic potential measuring system embodying my invention; Fig. 9 is a perspective view of the synchronous rectifier and electrostatic energy transfer apparatus embodied in the potential difference measuring system of my invention; Fig. 10 is a modified circuit arrangement of the electrostatic energy transfer and indicating system of my invention; Fig. 11 shows a balanced electron tube amplifier circuit connected with a mechanical collector of the character illustrated in Figs. 3 and 4, and utilizing a synchronous rectifier in association therewith; Fig. 12 shows a circuit arrangement for a potential difference measuring system of large sensitivity; Fig. 13 illustrates a modified circuit for a potential difference measuring system employing an electrostatic transfer apparatus corresponding to a portion of the apparatus illustrated in Fig. 9; and Fig. 14 is a theoretical view explaining the principles of my invention.

My invention provides means for indicating at a remote point the condition of the earth's atmosphere. The apparatus is particularly adapted for installation on aircraft where it is extremely important that the pilot be forewarned with respect to the condition of thunderstorms in the vicinity of flight. By various modifications of my system the earth's potential gradient may be indicated and the difference of potential between any two points or the time rate of change of either of these quantities may be measured. I have used the apparatus of my invention on lighter than air craft, such as the U. S. S. *Los Angeles* at Lakehurst, New Jersey, and have found the apparatus to be a very valuable auxiliary instrument on such craft.

I provide means for collecting an electrostatic charge from the atmosphere and operating an indicator thereby. I may employ a mechanical collector in which a pair of capacity areas are mechanically rotated and impart charges periodically to a measuring circuit. I may employ collectors which are radioactive, serving to take up a charge from the surrounding region and impress such charge upon the measuring circuit for operation of an indicator. The indicator may comprise a meter which readily detects the approach of a thunderstorm within a distance of twenty-five miles from the observer by the unsteadiness which develops in the indicator. As the storm approaches, the fluctuation of the indicator becomes more violent and generally reads somewhat less than its minimum value under quiet conditions. The fluctuations approach a maximum and as the storm recedes the meter tends to read somewhat more than its normal value under quiet conditions. It is thus possible to detect the approach of a storm, its approximate maximum, and to know when the storm is receding. While at a fixed point this information is valuable for warning an observer to take precautionary measures against damage, the information is of extreme value to the safety of aircraft as it is extraordinarily important for the pilot to know not only when the storm is approaching but also to know whether a storm has actually passed any particular point in the course of the aircraft. Such information will enable the pilot to avoid the storm and increases the safety of air navigation. Under certain conditions, it is highly desirable to know the relative potentials of two layers in the earth's atmosphere and the time rate of change of this potential difference, together with the electric gradient and also the magnitude of its time rate of change. All of this information is rapidly obtainable with the apparatus of my invention. This is of particular value in avoiding trouble in huge lighter than air craft.

The application of my invention is not limited to the measurement of the difference between static potentials in the atmosphere but may be employed wherever it is desired to measure electric potential differences such as in connection with a photo-electric cell. The more sensitive forms may be employed anywhere an electrometer may be used but with greater ruggedness and stability than can be secured with an electrometer.

In Fig. 1, reference character 11 represents the filament of a vacuum tube, 7 its control grid, 12 the shielding grid and 13 the plate. In the plate circuit is incorporated an indicator 10 which is actuated by a battery 9 so arranged that the potentials applied to the shield grid or plate may be varied at will. A battery 8 is used to heat the filament 11. The control grid 7 is connected to a high resistance 3 which is in turn connected to a potentiometer 6 and battery 4 in such a manner that the mean potential of the grid 7 may be kept at any suitable value. Collectors 1 and 2 are connected respectively to the control grid 7 and the filament 11. These collectors may be two wires carefully insulated from each other and suspended in an appropriate manner on ship board or above the ground. In certain instances the collector 2 has been formed by the grounded framework of the ship and the collector 1 has been formed by a wire trailing below the ship, which was maintained at the circumambient potential by means of a radioactive or other suitable collector. In case a long wire is used it is often found that the radioactive collector can be dispensed with. However, under normal circumstances I have found that the sensitivity of the apparatus is greatly increased by constructing the collectors 1 and 2 with a radioactive coating thereon, such as uranium, radium, ionium, radio lead-acetate and other radioactive materials. When this system is properly adjusted the approach of a thunderstorm is detected at about 25 miles from the observer by an unsteadiness which develops in the indicator 10. As the storm approaches the fluctuation of the indicator 10 becomes more violent and generally reads somewhat less than its mean value under quiet conditions. The fluctuations approach a maximum, and as the storm recedes the meter tends to read somewhat more than its normal value under quiet conditions. It is thus possible to detect the approach of a storm, its approximate maximum and know when it is receding.

In Fig. 2, I have shown a circuit arrangement for the thunderstorm indicator of my invention employing a three electrode tube without the inclusion of the shielding grid 12. The plate current in this circuit is balanced in a Wheatstone bridge circuit so that a far more sensitive indicator 10 may be employed than could otherwise be used. The Wheatstone bridge circuit is shown as including resistances 14 and 15 in two of the arms of the bridge in the plate circuit, resistance 16 in an opposite arm of the bridge circuit and the impedances of the electron tube between the plate and cathode constituting the other arm of the bridge. A balance is normally obtained independent of static potentials on the collectors 1 and 2 so that the operation of indicator 10 directly depends upon the potential incident upon the collectors in the vicinity of the apparatus. In Fig. 2 the collectors 1 and 2 have been illustrated as having a radioactive coating thereon but it will be understood that these collectors may be conductors of fairly large capacity or conductors having radioactive collectors connected thereto.

All the apparatus utilized in the present invention may be so located that the electric potential may be indicated at a point remote from the apparatus. In Figs. 1 and 2, I have indicated that the collectors 1 and 2 are radioactive. Often collectors of this type are unsuitable for use on aircraft and I have devised an induction or mechanical collector which is especially suitable for use with the appended circuits.

Fig. 3 shows a system which I have called a mechanical collector and consists of an insulated shaft 23, carrying conductors 24 and 25 which are rotated on the shaft by means of a driving motor 21. The collectors 24 and 25 rotating in an electric field produce currents and electromotive forces which are picked up by the brush mechanism 30a from commutator segments 26, 27 and holders 30. I provide discharge contacts 29, 31 and 28, 32 in association with shaft 23 for draining the collectors of charges at each revolution. Means are provided to shift the position of the brushes 30a with respect to the position of the collectors 24, by means of the mechanism shown at 30 operative in arcuate slots 30b. The essential requirements of this collector are that the balls 24 be connected to the brushes 30 in alternate relation. The collectors are alternately grounded by means of the pegs 28 and 29, when the collectors are in their horizontal position. This is schematically shown in Fig. 5.

In Fig. 6 the brush mechanism is shown connected to two vacuum tubes arranged in balanced relationship. The cathodes of the tubes are indicated at 39 energized from battery 40. The grid electrodes indicated at 37 and connected to the input circuits which include resistance elements 33 and 34 connected to the variable tap on potentiometer 35 which is connected in shunt with biasing battery 36 which completes the path of the input circuits for the two tubes to the cathode circuit 39. The output circuit includes resistors 42 and 43 and the indicator 44 connected in bridge arrangement thereto. The grids 37 of each of the tubes connect to the brushes 30a which establish alternate connection through the segments 26—27 with the collectors 24. The rotation of the collectors 24 generates a potential which is proportional to the electrical field in which they rotate. This potential and slight current flowing through the high resistors 33 and 34 affect the internal resistance of the vacuum tubes in such a way as to upset the bridge balance whose arms comprise the internal resistances of the tubes and the resistors 42 and 43. The mean potential of both grids is maintained at a suitable value by means of the potentiometer 35 and battery 36. The apparatus is operated in such a manner that the indicator 44 will not only indicate the magnitude of the electric field, but its direction. This is of particular importance in the aircraft navigation for it aids in determining whether a storm is due or whether it has passed.

Fig. 7 shows a modified form of circuit embodying the principles of my invention where the potential of collector 1 may be indicated by the use of a constantly variable capacity 18 which may be driven to maximum and minimum values periodically by means of an electric motor schematically represented at 19. The grid electrode 7 is maintained at a suitable potential by means of resistor 3 and a potentiometer 6 and battery 4. If a charge is placed on collector 1, the varying capacity 18 causes an average change in the mean grid potential and the indicator 10 takes on a different reading. The indicator 10 may then be calibrated in terms of the potential applied to the collector.

In Fig. 8, I have illustrated a system for determining the electrical conditions where the electrostatic charges may be relatively slight. While large potential differences are readily observed with the indicator system of Figs. 1–7, potential differences which are only a small fraction of a volt require more refined methods for the measurement thereof. Fig. 8 shows a typical arrangement for the modified apparatus of my invention. A condenser system mounted within an electrically shielded casing 45 is supplied with the potentials the differences between which are to be measured through conductors 46 and 47. For the purpose of illustrating my invention, I have shown the condenser as consisting of a pair of concentrical tubular members, one of the tubular members consisting of the split sections 48 and 49 and the other tubular member comprising split sections 50 and 51. The split sections 48 and 49 are insulatingly mounted by amber or other suitable insulators indicated at 48a and 49a, serving to spacially mount the condenser away from the shield 45. The plates are mounted in concentrical relation. Collector rings 50a and 51a are carried by the central shaft 52 and connect to the sections 50 and 51 of the condenser system as indicated. Brushes 51b and 50b lead the induced alternating current collected from sections 48 and 49 to the input circuit of the electron tube system 53. The electron tube system 53 includes control grid 54, cathode 55, plate electrode 56 and shield grid 57. The cathode is heated from battery 58. The shield grid potential is supplied from battery 59. The plate circuit power is supplied from battery 60 through primary winding 61 of the transformer 62. The input circuit includes biasing battery 63 and potentiometer 64 to the tap 65 from which there extends a connection to brush 50b. An intermediate connection may be provided between the input circuit and the collector which connects to binding post 47 leading to condenser plate 49 as I have indicated by dotted line 66 and tap 67. The input circuit of the electron tube 53 is bridged by a high resistance which is conveniently formed by the discharge tube 68 including a plate electrode 69 and a cathode 70. The cathode 70 is constructed with a suitable coating thereon for the emission of positively charged ions which bombard the plate electrode 69, or gas may be left in the tube to supply positive ions. The resistance path across the input circuit may be controlled by changing the ion emitting properties of the cathode 70 by movement of contactor 71 on the filament heating rheostat which may be connected in circuit with the battery 58. When the two condenser plates 48 and 49 are at a different potential, an alternating current E. M. F. is impressed upon the grid 54 of electron tube 53. This alternating current E. M. F. is amplified by the electron tube 53 and is supplied to the output transformer 62, the secondary winding 72 of which supplies a slight potential to the output rectifier system 73 for the operation of indicating meter 74. The output rectifier system consists of a pair of commutator members 75 and 76, which are split and insulated one from the other as represented at 77. The commutator members connect to the opposite ends of secondary winding 72 through brushes 72a and 72b. A set of brushes 78 and 79 bear directly upon the commutator members 75 and 76 in such manner that the circuit to the indicator 74 is alternately reversed. A driving motor 80 imparts rotary movement to shaft 52 which drives the condenser members 50—51, collector rings 50a and 51a and the rectifying commutator system 73. The rectifier system operates in synchronism with the movement of the condenser plates 50—51 and accordingly in synchronism with the alternating current E. M. F. which is impressed upon the grid 54.

While any system of rectification may be employed, I have found that synchronous rectification greatly reduces deflections due to accidental variations. The rotary condenser is at all times well insulated from the surrounding shield 45. That value of the resistance path across the input of electron tube system 53 is selected which will permit of the maximum movement of the indicator 74 from a normal position as the electrostatic potentials in the vicinity of the collectors which connect to the apparatus are increased.

In instances where it is possible to mount the indicating apparatus in close proximity to the collector, I may employ a synchronous rectifier and a collector system as shown in Fig. 10. In this arrangement the electrostatic collector is represented at 81 connected to a condenser plate 82. An opposite condenser plate 83 is capacitatively related to condenser plate 82 and between these plates there is cyclically arranged the intermediate plate 96, periodically increasing and decreasing the capacity of the path from the collector 81 to the indicator apparatus. A motor 99 revolves the plate 96 through rotary shaft 97, which shaft carries a collector ring 95 connecting to plate 96 through which a connection may be established through brush 94 with one side of the input circuit of the electron tube 84. A cam 98 is carried by shaft 97 serving to move resilient contact 100 between contacts 101 and 102 thereby alternately connecting the indicator 104 to the different parts of the secondary winding 103. The tube 84 includes grid 85, filament 86 and plate 87. The input circuit extending between grid 85 and filament 86 connects to the condenser plate 83 on the grid side of the input circuit and to the movable plate 96 on the filament side of the input circuit. The input circuit includes a resistance path 93 connecting to a variable tap or potentiometer 92 which is connected in shunt with battery 91 and auxiliary potentiometer 92a connects in shunt with the potentiometer 92 and has a variable tap thereon connecting to the brush 94 which in turn connects to the movable plate 96. A ground connection 130 may lead to the variable tap on the potentiometer 92a. The output circuit of tube 84 includes winding 88 and battery 89. The filament 86 is heated from battery 90. The potentials which are collected by collector 81 are impressed upon the indicator in recurring cycles, the connection of the indicator being reversed at each recurring cycle synchronously with the supply of energy to the circuit of electron tube 84, resulting in the integration of energy representing the electrostatic potentials incident upon collector 81.

In order to increase the sensitivity of the indicator system, I may arrange the electron tubes in push-pull arrangement as illustrated in Fig. 11. In this arrangement a pair of inductor collectors as represented in Figs. 3, 4, 5 and 6 are revolved on shaft 97 by the motor 99. The collectors 24 connect to separate collector rings 110 which connect through brushes 109 with the grids of electron tubes 111 and 112. The input circuit of tubes 111 and 112 is completed by resistance 107 connected at its midpont 108 with the cathode circuit of the tubes 111 and 112 arranged in push-pull relationship. The output circuit of the two tubes includes winding 106 of the transformer with a potential supply 105 common to the two tubes. Secondary winding 103 is coupled with primary winding 106 and includes the indicator 104 in circuit therewith in a manner similar to the description given for Fig. 10. The reversing circuit described in connection with Fig. 10 is employed in Fig. 11 in similar relation. The charges developed on collectors 24 are impressed simultaneously on the grid electrodes of tubes 111 and 112 and the effects thereof integrated by the rectification circuit will operate synchronously with the movement of the collectors 24.

In order to still further increase the sensitivity of the potential difference measuring system I may employ separate collectors of the character shown in Fig. 10, coupled to the circuits of a push-pull amplifier system as shown in Fig. 12. In this circuit electron tubes 113 and 114 of the screen grid type are illustrated connected in push-pull arrangement. The input circuits include resistance elements represented at 107 with a biasing battery 115 and shunting potentiometer arranged to supply the required biasing potential to either electron tube 113 or 114. Driving motor 99 revolves shaft 97 which carries the movable condenser plate members 96 and 118. Condenser plate member 118 cyclically rotates between condenser plates 122 and 123 where the condenser plate 122 connects to the collector 120 and the condenser plate 123 connects to the grid of the electron tube 113. The collector 121 connects to condenser plate 124 positioned in parallel relationship to condenser plate 125 which connects to the grid of electron tube 114. The condenser plate 96 cyclically sweeps between condenser plates 124 and 125. The output circuits of tubes 113 and 114 lead to the winding 106 in circuit with high potential source 105. The secondary winding 103 leads to the indicator circuit 104 and rectifier 100—101—102 which is associated therewith. The operation of the rectifier under control of cam 98 is timed with respect to the increase and decrease of capacity brought about by the interleaving of condenser plates 96 between plates 124—125 and the plate 118 between condenser plates 122 and 123. Condenser plates 96 and 118 are connected in common to conductor 131 and to the return path constituting the input circuits of both of the electron tubes. Connections 132 and 133 are taken from the screen grids of the electron tube 113 and 114 to the source of potential 105 in the output circuit common to the two tubes.

In Fig. 13, I have illustrated a simple form of potential difference measuring apparatus in which the charging current from the plates 50 and 51 flows through the resistance 3 in the form of rectified current impulses. The rectification was obtained prior to the impression of the current upon the electron tube. The condenser plates 48 and 49 which connect through terminals 46 and 47 with the collector members impress charges upon plates 50 and 51 which are revolved by means of motor 80. Brushes 134 and 135 directly contact with the condenser plates 50 and 51 conveying charges therein to the input circuit of the vacuum tube. The vacuum tube in this instance is connected to function as a vacuum tube voltmeter and the current through the resistance is measured by the deflection of the meter 10 from its balanced position. The balanced arrangement is brought about by the connection of the meter 10 across the arms of a Wheatstone bridge formed by resistances 14 and 16 on the one side and the resistance 15 and the path between filament 11 and plate 13 of the vacuum tube on the other side. Battery 9 is connected across the center portion of the Wheatstone bridge as illustrated.

The theory of application of my invention will be understood by reference to Fig. 14. Assume that an electrostatic charge $q$ is placed upon the conductor 24 with the variable capacity of condenser C equal to zero. The potential of collector 24 is then:

$$V = \frac{q}{C_0}$$

Now as the capacity is increased by moving the condenser plates closer together, the charge on the smaller condenser $C_0$ which is connected in shunt to the collector 24 as shown is now shared with the condenser C. In the process of sharing the charge, the charge must be retransferred from condenser $C_0$ through the resistance R. That is the charging current flowing from $C_0$ into C flows through the resistance R and the product of this current and resistance gives the potential difference across R or $$e = R\frac{dq}{dt}$$

Now the current will drop to zero when the potential of $C_0$ and C becomes equal and if at this time the capacity of C is decreased the current will flow in the opposite direction. Thus if C is increased and decreased periodically then an alternating potential of complicated wave form will be produced across R. By applying this potential $e$ to any suitable system it can be measured. By amplifying it and rectifying the amplified current very small values of $e$ can be measured and consequently very small values of the static charge $q$ can be measured. It is important to note that the process of charging and discharging the condenser C does not in any way affect the total charge $q$ on the system since it is perfectly insulated. It is clear therefore that by use of this instrument extremely small amounts of electrical energy can be detected. On the instruments which I have built I have obtained deflections on a rugged indicator corresponding to $10^{-10}$ ergs of electrical energy.

By alternately increasing and decreasing the capacity of the system static charges can be made to produce dynamic electric currents. By synchronously rectifying the alternating current so produced and applying it to a rectifier the magnitude of the static charges may be measured. As heretofore pointed out the indicating mechanism may be closely adjacent to the collector system or the indicating system may be located at a remote point with respect to the collector.

While I have described my invention in certain of its preferred embodiments, I desire that it be understood that modifications may be made and that no limitations upon my invention are intended other than are imposed by the scope of the appended claims.

The invention herein described may be manufactured and used by or for the Government of the United States of America for governmental purposes without the payment of any royalties thereon.

What I claim as new and desire to secure by Letters Patent of the United States is as follows:

1. In a device for indicating electrostatic potential differences in combination, fixed insulated electrodes, electrodes movable into and out of position adjacent thereto, an amplifier connected to said movable electrodes, an output circuit connected to said amplifier, a rectifier in the output circuit operating in synchronism with said movable electrodes, and an indicator connected with said rectifier.

2. In an apparatus for measuring atmospheric potential differences, a pair of electrostatic collectors, an electron tube system having an input circuit and an output circuit, means for rotatably driving said collectors to produce dynamic currents, connections between said collectors and said electron tube system, an indicator, and a rectifier circuit interconnecting said output circuit with said indicator said rectifier circuit being operated synchronously with respect to the operation of the means for driving said collectors.

3. In an apparatus for measuring atmospheric potential differences, a pair of electrostatic collectors, an electron tube system having an input circuit and an output circuit, means for alternately increasing and decreasing the capacity between said collectors and the input circuit of said electron tube system, an indicator connected to said output circuit and a rectifier connected with said indicator and means for operating said rectifier synchronously with the change in capacity between said collectors and said input circuit.

4. In an apparatus for measuring the potential gradient of the atmosphere comprising a rotating mechanism including a shaft member, a pair of radially extending collectors carried by said shaft member, a responsive circuit, an indicator connected with said responsive circuit, and means for alternately transferring charges incident upon said collectors to said responsive circuit and alternately charging said collectors subsequent to the transfer of a charge therefrom to said responsive circuit for integrating the effect of said charges upon said indicator and determining the magnitude thereof.

5. In an electrostatic voltmeter, conductors upon which electrostatic charges are impressed, adjacent moving conductors, an amplifier to which the latter conductors are connected, an output circuit from said amplifier, an indicator connected to said output circuit, and a contact rectifier in the output circuit between the amplifier and the indicator operating in synchronism with said moving conductors.

6. In a device for indicating electrostatic charges, movable electrodes adapted to be rotated in the field of the charge to be indicated, means for so rotating the electrodes, an amplifier connected to the rotating electrodes, a rectifier connected with the output from the amplifier and operating in synchronism with the electrodes, and an indicator connected with the output from the amplifier.

7. In a device for indicating electrostatic charges and potential differences, a movable electrode, an amplifier means including an input circuit connected with said electrode, means for continuously moving the electrode toward and from the charge to produce a dynamic current in said circuit, a rectifier connected with the output from the amplifier and operating in synchronism with the electrode, and an indicator connected with the output from the rectifier.

8. In a device for indicating potential differences, two sets of electrodes, means for rotating one set adjacent the other set and out of contact therewith, means for connecting one set of electrodes with the source of potential difference, a rectifier connected to the other set of electrodes and operated in synchronism with the rotating electrodes, and an indicator connected with the output from the rectifier.

9. In a device for indicating potential differences, two sets of insulated electrodes, means for connecting one set of electrodes with the source of potential difference, an amplifier connected to the other set of electrodes, means for rotating one set of electrodes adjacent to the other, an output circuit connected to the amplifier, a rectifier connected with the output circuit and operating in synchronism with the rotating electrodes, and an indicator connected with the output from the rectifier.

10. In a device for indicating electrostatic charges, electrodes adapted to be moved in the field of the charge to be indicated, means for continuously moving the electrodes in said field, an associated means for rectifying the fluctuating charge induced on the moving electrodes, and an indicator connected with the output from the rectifying means.

11. In a device for indicating electrostatic potential differences, in combination, fixed insulated electrodes, electrodes movable into and out of position adjacent thereto, a rectifier connected with the movable electrodes and operating in synchronism therewith, and an indicator connected with the output from the rectifier.

12. In a device for indicating electrostatic charges, electrodes adapted to be moved in the field of the charge to be indicated, means for continuously moving the electrodes in said field, an associated means for rectifying the fluctuating charges induced on the moving electrodes, and an indicator connected with the output from the rectifying means.

13. A device for measuring electrostatic charges or potential differences which comprises dynamic means influenced by the field of the charge or potential difference to be measured for deriving periodic currents therefrom, and means for indicating said currents.

14. A device for indicating the presence of electrostatic charges which comprises dynamic means influenced by the field of a charge for deriving periodic currents therefrom, and means for indicating said currents.

15. A device for measuring electrostatic charges or potential differences which comprises means for establishing an electrostatic field, dynamic means influenced by said field for deriving periodic current therefrom, and means for indicating the said current.

ROSS GUNN.